United States Patent
Ganguly et al.

(10) Patent No.: US 12,362,921 B2
(45) Date of Patent: *Jul. 15, 2025

(54) SYSTEMS AND METHODS FOR PROVIDING USER AUTHENTICATION FOR QUANTUM-ENTANGLED COMMUNICATIONS IN A CLOUD ENVIRONMENT

(71) Applicant: Cisco Technology, Inc., San Jose, CA (US)

(72) Inventors: Santanu Ganguly, Ashford (GB); D. Brice Achkir, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/492,277

(22) Filed: Oct. 23, 2023

(65) Prior Publication Data

US 2024/0250811 A1    Jul. 25, 2024

Related U.S. Application Data

(63) Continuation of application No. 17/730,606, filed on Apr. 27, 2022, now Pat. No. 11,818,257.

(51) Int. Cl.
*H04L 9/08* (2006.01)
*H04L 9/30* (2006.01)
*H04L 9/32* (2006.01)

(52) U.S. Cl.
CPC .......... *H04L 9/0852* (2013.01); *H04L 9/3073* (2013.01); *H04L 9/3226* (2013.01)

(58) Field of Classification Search
None
See application file for complete search history.

(56) References Cited

U.S. PATENT DOCUMENTS 11,387,913 B2 *   7/2022   Innes ................... H04L 9/0833
11,411,658 B1 ‡   8/2022   Rauschenbach ....... H04B 10/70
(Continued)

FOREIGN PATENT DOCUMENTS

WO    WO-201706744    ‡   4/2017

OTHER PUBLICATIONS

Zukarnain et al., Quantum Key Distribution Approach For Cloud Authentication: Enhance Tight Finite Key, International Conference on Computer Science and Information Systems, CSIS 2014, http://iieng.org/, Oct. 17-18, 2014, pp. 1-6.‡

*Primary Examiner* — Trang T Doan
(74) *Attorney, Agent, or Firm* — Polsinelli P.C.

(57) ABSTRACT

Disclosed are a system and method of establishing secure communications between nodes in a cloud environment. The method includes receiving a registration of a first user at a quantum processor service provider, receiving at the quantum processor service provider a request for authentication of the first registered user, the request comprising at least the password and the registration number, when the password and registration number match stored data at the quantum processor service provider for the first registered user, generating an EPR entangled pair and transmitting the EPR entangled pair to a first computing device of the first registered user, wherein the first registered user utilizes the EPR entangled pair in order to communicate with a second computing device associated with a second registered user. The quantum processor service provider can include a quantum EPR (Einstein Podoslky and Rosen) processor (QEP) and a logically co-located computer server.

17 Claims, 7 Drawing Sheets

(56) References Cited

U.S. PATENT DOCUMENTS

| | | | | |
|---|---|---|---|---|
| 2019/0123896 A1* | 4/2019 | Hong | .................... | H04L 9/0869 |
| 2020/0274703 A1* | 8/2020 | Lukens | ................. | H04L 9/0858 |
| 2020/0374211 A1* | 11/2020 | Griffin | .................. | H04L 45/745 |
| 2021/0111898 A1‡ | 4/2021 | McCarty | ............. | H04L 63/0853 |
| 2021/0158199 A1‡ | 5/2021 | Heckey | .................... | G06F 9/54 |
| 2021/0176055 A1‡ | 6/2021 | Boudreau | ............. | H04L 9/0819 |
| 2022/0044240 A1‡ | 2/2022 | Hukmani | ............... | H04L 9/0852 |
| 2022/0166773 A1* | 5/2022 | Trost | ................... | H04L 63/0807 |
| 2022/0215279 A1* | 7/2022 | Rahman | ................. | G01C 19/72 |
| 2022/0269976 A1* | 8/2022 | Wang | .................... | H04L 9/0855 |
| 2022/0309375 A1* | 9/2022 | Vacon | ................. | G06F 12/0895 |
| 2022/0408248 A1* | 12/2022 | Balmakhtar | .......... | H04W 12/06 |

\* cited by examiner
‡ imported from a related application

SYSTEMS AND METHODS FOR PROVIDING USER AUTHENTICATION FOR QUANTUM-ENTANGLED COMMUNICATIONS IN A CLOUD ENVIRONMENT

CROSS-REFERENCE TO RELATED APPLICATION

This application claims priority to U.S. Non-Provisional patent application Ser. No. 17/730,606, filed on Apr. 27, 2022, entitled "SYSTEMS AND METHODS FOR PROVIDING USER AUTHENTICATION FOR QUANTUM-ENTANGLED COMMUNICATIONS IN A CLOUD ENVIRONMENT", the content of which is incorporated herein by reference in its entirety.

TECHNICAL FIELD

This disclosure relates generally to quantum entanglement and quantum teleportation and also to an architecture for secure quantum key management and distribution via routing. The focus of this disclosure is on a user authentication process for a quantum processor service provider which will then provide quantum entangled pairs for secure communication between the parties.

BACKGROUND

Modern cryptography algorithms are based on the fundamental process of factoring large integers into their primes, which is said to be intractable. But modern cryptography is vulnerable to both technological progress of quantum computing power and evolution in mathematics to quickly reverse one-way functions such as that of factoring large integers. One of the ways to mitigate this threat is quantum key distribution (QKD).

However, large scale industrial implementation of QRNG (quantum random number generator) based QKD still faces several challenges such as secret key rate, distance, size, cost and practical security. The threat of the speed of factorization by near-term quantum computing platform is now considered real.

The main cryptographic protocols used today to secure the Internet and the vital services accessed across the Internet, such financial transactions, are all susceptible to attack by the development of a sufficiently large and efficient quantum computer.

In case of classical computation, the complexity of searching in an unstructured data set of size n is $O(n)$, e.g., in the worst possible case, all the records will need to be inspected. The well-known Grover's algorithm allows to solve this problem in $O(\sqrt{n})$, steps. This essentially means that, if a user has 40 bits and needs to find a combination that satisfies certain condition, then in the classical case, the user needs to process approximately $10^{12}$ different combinations, whereas the quantum algorithm will yield a result in about $10^6$ queries.

Rather than depending on the complexity of factoring large numbers, quantum cryptography is based on the fundamental and unchanging principles of quantum mechanics, which in turn the efficient Shor's algorithm is based. Shor's algorithm is a polynomial-time quantum computer algorithm for integer factorization.

Several industry leaders and financial institutions have started testing quantum computing as an option for their future production network. HSBC, Barclay's bank, Volkswagen in enterprise space and NASA, governments of US and China are well known names who have engaged in developing applications based on various quantum technologies in computing space in recent years. Notable quantum computing vendors today are Google, IBM Q, Rigetti, Xanadu, D-Wave Systems, Ali Baba, etc. However, much of the access that users have to public cloud environments is not as secure as it should be.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
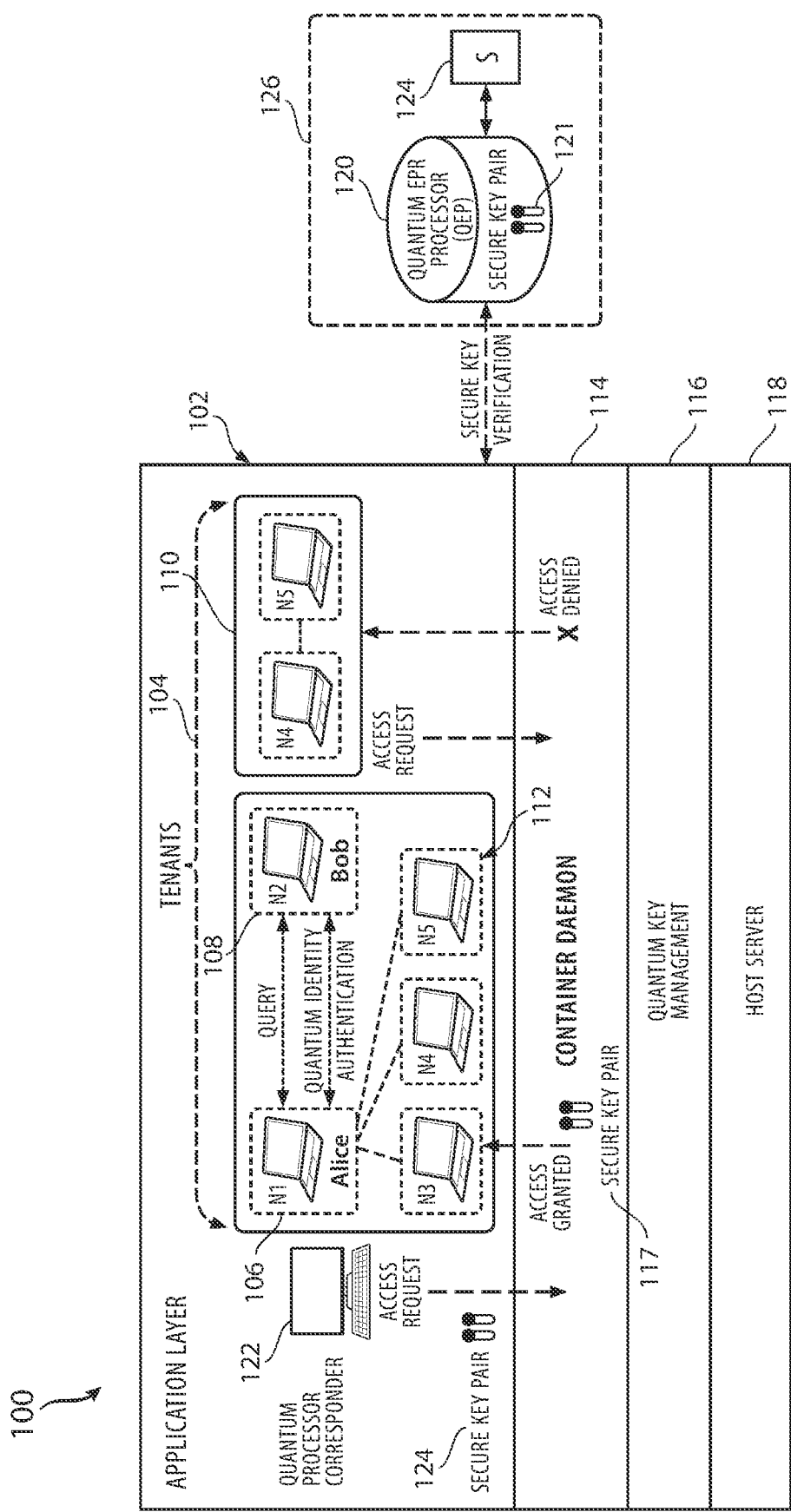
FIG. 1 illustrates the concept of security leveraging quantum teleportation.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

In order to counter the threat to security in a cloud environment, a mechanism is needed to tighten security for communication from threats of post-quantum attacks. A major challenge of leveraging quantum key distribution in cloud is to design a secure key agreement between two users via a quantum key management service, which can be managed by the Cloud Service Provider (CSP) in this scenario. This disclosure focuses on how to provide a new approach to providing a more secure service to users of cloud environments. As part of the service, the necessary hardware is made available to users of the cloud to be able to receive quantum particles.

There are users, for example, in defense and finance industry who may require additional private security after being authenticated into the cloud environment. The following proposal is for replacing the current day public key cryptography with a variety of quantum algorithms.

Financial and federal government entities are demanding solutions for quantum safe communication not only in a point-to-point scenario where quantum key distribution (QKD) and/or Cisco SKIP (Secure Key Import Protocol) can be used either separately or in tandem, but also when they access public cloud. Quantum attack secure communication in a cloud-based infrastructure has become a mandatory business critical security challenge.

A major challenge of leveraging quantum key distribution in cloud has been the design of a secure authentication agreement between two users in the CSP governed scenario. There are users, for example, in defense, federal governments and financial industry who may require additional private security after being authenticated into the cloud environment.

This disclosure addresses architecture of the following offerings: 1) Users who require tightening of security in a cloud environment leverage a distributed entanglement-based service. 2) The disclosure defines architecture of inter-user querying and inter-user further authentication before establishing trust. 3) The disclosure provides an algorithm which covers the user authentication process for users to register with the quantum processor service provider. Other patent applications will cover the actual distribution of quantum entangled pairs to various user devices to enable quantum enabled secure communications. This disclosure focuses on the preliminary steps of authorization of the users with the quantum processor service provider.

An example method of this disclosure includes receiving a log-in of a first user into a cloud environment using a classical authentication process, receiving a log-in of a second user in the cloud environment using the classical authentication process and presenting to the first user one or more options to use a secure inter-user communication security service leveraging quantum teleportation in order to communication with the second user in the cloud environment, wherein the secure inter-user communication security service optionally uses a quantum EPR (Einstein Podoslky and Rosen) processor (QEP).

Applying the robust additional security via quantum teleportation for communications between the first user and the second user within the cloud environment further can include implementing a query process from the first user to the second user for quantum key distribution of a secure key pair generated by the QEP and implementing an identify authentication process between the first user and the second user using the secure key pair generated by the QEP. This enables both user authentication and then secure communication between users in the cloud environment.

An example method can include receiving, from a first user, a first authentication request at a quantum processor service provider, the first authentication request comprising first user authentication credentials, receiving, from a second user, a second authentication request at the quantum processor service provider, the second authentication request comprising second user authentication credentials, verifying, by the quantum processor service provider, the first user authentication credentials against stored data to yield a first authentication and verifying, by the quantum processor service provider, the first user authentication credentials against stored data to yield a second authentication. When the first authentication confirms an identity of the first user, the method includes granting the first user access to a quantum entangled processor for enabling secure communications and transmitting a first secure key pair of quantum entangled particles to a first computing device associated with the first user for use in verifying, for the first user, the second user to enable a secure communication between the first user and the second user. When the first authentication does not confirm the identity of the first user, the method includes denying the first user access to the quantum entangled processor. When the second authentication confirms an identity of the second user, the method includes granting the second user access to the quantum entangled processor for enabling secure communications and transmitting a second secure key pair of quantum entangled particles to a second computing device associated with the second user for use in verifying, for the second user, the first user to enable the secure communication between the first user and the second user. When the second authentication does not confirm the identity of the second user, the method includes denying the second user access to the quantum entangled processor.

Another example method includes receiving a registration of a first user at a quantum processor service provider, the registration comprises one or more of a login identification, a registration number, a password, wherein the quantum processor service provider comprises a logically co-located quantum EPR (Einstein Podoslky and Rosen) processor (QEP) and a computer server to yield a first registered user and receiving at the quantum processor service provider a request for authentication of the first registered user, the request comprising at least the password and the registration number. When the password and registration number match stored data at the quantum processor service provider for the first registered user, the method includes generating, by the QEP, an EPR entangled pair and transmitting the EPR entangled pair to a first computing device of the first registered user, wherein the first registered user utilizes the EPR entangled pair in order to communicate with a second computing device associated with a second registered user.

An example system can include a quantum processor service provider having a quantum EPR (Einstein Podoslky and Rosen) processor (QEP) and a computer server logically co-located with the QEP. The computer server can be configured to execute instructions stored on a computer-readable storage medium, the instructions causing the computer server to perform operations including receiving a registration of a first user at a quantum processor service provider, the registration comprises one or more of a login identification, a registration number, and a password, to yield a first registered user and receiving a request for authentication of the first registered user, the request comprising at least the password and the registration number. When the password and registration number match stored data at the quantum processor service provider for the first registered user, the instructions can cause to be generated, by the QEP, an EPR entangled pair and cause the EPR entangled pair to be transmitted to a first computing device of the first registered user, wherein the first registered user utilizes the EPR entangled pair in order to communicate with a second computing device associated with a second registered user.

In quantum computing, a qubit or quantum bit is the basic unit of quantum information. It can be compared to a quantum version of the classic binary bit (a 0 or a 1) physically realized with a two-state device. A qubit is a two-state (or two-level) quantum-mechanical system, one of the simplest quantum systems displaying the peculiarity of quantum mechanics. Examples include the spin of an electron in which the two levels can be taken as spin up and spin down; or the polarization of a single photon in which the two states can be taken to be the vertical polarization and the horizontal polarization. In a classical system, a bit would have to be in one state or the other and would be characterized or assigned a 0 or a 1. However, quantum mechanics allows the qubit to be in a coherent superposition of both states simultaneously, a property that is fundamental to quantum mechanics and quantum computing. This disclosure, when it references a qubit, can mean any quantum bit which uses any state information in its superposition of states.

In this aspect, the method further can include implementing a query process from the first user to the second user for quantum key distribution of a secure key pair generated by a quantum EPR processor (QEP) and implementing an identify authentication process between the first user and the second user using the secure key pair generated by the QEP.

Description of Example Embodiments

Disclosed herein are systems, methods, and computer-readable media for innovations which focus on the ability to improve the security of communications in a cloud environment using quantum mechanics. With the rise of cloud adoption in enterprise, financial industries and governments, the security of communication with and within a cloud infrastructure has become paramount. In order to use cloud services a client needs to provide a ticket or a token which, for a cloud service, is a series of bits enciphered using a private key for the same cloud service. This disclosure addresses that challenge and proposes a quantum key and entanglement enhanced model for quantum enhanced security of a cloud infrastructure. Two quantum enhanced security measures are offered as services: a hybrid classical-quantum method of Kerberos tightened with quantum key distribution (QKD) for cloud authentication and quantum teleportation-based security to enhance the same.

Kerberos refers to a computer-network authentication protocol that works on the basis of tickets to allow nodes communicating over a non-secure network to prove their identity to one another in a secure manner. Kerberos protocol messages are protected against eavesdropping and replay attacks. Kerberos builds on symmetric-key cryptography and requires a trusted third party, and optionally may use public-key cryptography during certain phases of authentication. Kerberos uses UDP (User Datagram Protocol) port 88 by default. Those of skill in the art will understand the Kerberos protocol and how to implement it.

This discloses architecture for the following offerings. First, the disclosure addresses users who require tightening of security in a cloud environment to leverage a distributed entanglement-based service. The disclosure defines an architecture of inter-user querying and inter-user further authentication before establishing trust.

The disclosure in one aspect utilizes quantum encryption through applying a Kerberos-based model in a hybrid quantum-classical architecture. The architecture enables quantum enhanced secure communication between users in a cloud environment. Users are offered quantum enhanced security measures as services as follows: First, the users log in to their cloud environment in their usual way through an existing classical authentication process. Once the users authenticate and log in to their cloud environment, they are offered the option of using a higher form of inter-user communication security leveraging quantum teleportation. This "as-a-Service" option consists of offering the customers choices including a first choice of using Quantum SeCurity as a service (QSeCaaS) for communication between users on the cloud with the help of a server which is referred to as Quantum EPR Processor (QEP). The QEP concept consists of a quantum state generating server which acts as a source of EPR Bell state pairs and offering robust additional security via quantum teleportation.

A second choice consists of offering the customers, once they are authenticated and logged, Quantum SeCurity as a service (QSeCaaS) to securely control communication between users of the cloud services at different locations. The combination of these steps, as a service offering, are novel and part of the focus of this disclosure.

A third choice consists of offering the customers Quantum SeCurity as a service (QSeCaaS) to securely control communication between containers running on cloud and associated daemons leveraging a server such as the QEP. In the instance of a container platform, the daemon itself can act as an attack surface. Activating and running of the container daemon is not directly related to root privileges. In case an unauthorized access to the daemon is managed, then root access compromising the entire environment and system can be achieved by a rogue element. This approach is adapted from the SwissQuantum field test. The technology used for this step is quantum teleportation and usage of a quantum processor server (QEP in the document). Note that the SwissQuantum quantum key distribution network was used for several years and was used to test the reliability of the quantum layer over a long period of time in a production environment. See Stucki et al., Long-term performance of the SwissQuantum quantum key distribution network in a field environment, New Journal of Physics, Vol. 13, December 2011, incorporated herein by reference.

Next is introduced an architecture for quantum enhanced secure communication between users in a cloud environment. FIG. 1 illustrates the general cloud environment 100. Users or tenants 104 are offered quantum enhanced security measures as services as follows. The users 104 log in to their cloud environment in their usual way using an existing classical authentication process. This can be done in an application layer 102 of the cloud environment 100. Once the users 104 authenticate and log in to their cloud environment 100, they are offered the option of using a higher form of inter-user communication security leveraging quantum teleportation. This "as-a-Service" option consists of offering the customers one or more options for higher security including the application of Quantum Security as a service (QSeCaaS) for communication between users (such as Alice 106 as a first node N1 and Bob 108 as a second node N2) on the cloud environment 100 with the help of a QEP 120. The QEP 120 consists of a quantum state generating server which acts as a source of EPR Bell state pairs and offering robust additional security via quantum teleportation.

A container daemon 114 runs a number of the processes of this new concept and, for example, receives a secure key pair 117 from the QEP 120 and/or a secure key pair 124 from the application layer 102 and uses the secure key pair to process requests for access from, for example, a quantum processor corresponder 122, a first user 106, a second user 108 or other users 110, 112 (Nodes N3, N4, N5, N6, N7 illustrated by way of example as other tenants of the cloud environment 100). The computer 122 can also represent Alice's computer or the computer of the first user from which the access request is first received. The container daemon 114 can run the processes associated with containers provisioned for the various users 104. A quantum key management layer 116 and be also operational on a host server 118 for processing the quantum keys as disclosed herein. The other computers 110 and 112 are shown for the purpose of illustrating that many people can access the cloud environment 102 and can have access to the options and secure communication approach disclosed herein.

A quantum processor service provider 126 can include both the QEP 120 and a computer server 124 that are physical and/or logically co-located and work together to handle both classical authentication and other processes by the computer server 124 and the quantum generation and distribution of entangled particles by the QEP 120.

Before the users can avail of the benefits of the enhanced security using the quantum processor service provider 126, they need to authenticate against the server and run authorization verification. This authentication process will involve protocol for cloud server authentication and verification of entanglements under the assumption that a third malicious presence is able to change or hijack the key shared between the users and the QEP.

The approach disclosed herein assumes that the proper and necessary hardware is available as part of the cloud environment 100 for each of the parties that need to be authenticated themselves first and then to authenticate each other to be able to receive secure key pairs and to evaluate the respective quantum participles or qubits. The ability to receive quantum particles can be included in the hardware associated with the host server 118. The cloud environment 100 in this case can include the classical components 102 of a cloud with users 104 or tenants who can access compute resources as well as the addition in this case of the EQP 120 for generating secure key pairs 121 for users to utilize for cloud container security according to this disclosure. Part of the new service is quantum hardware that is part of the host service 118 such that each tenant can get their respective secure key pairs associated with their containers in the cloud environment 100.

The process shown in FIG. 1 would proceed as follows. The uses must register with the system. The user Alice 106 or Bob 108 wishing to access the service requests permission to the quantum processor service provider 126 and establish a communication channel with the QEP server 120. In order to have that permission, the user needs to register for the service. The user communicates a request ID (rID) to the quantum processor service provider (QSP) 126 which in this case is performed by a server 124 which is logically collocated with the QEP 120. The quantum processor service provider 126 processes the parameters for authentication such as login (l_id), registration number (rn), password (pwd) and stores the values mapped to the specific user rID. The QSP 126 confirms the password to the user.

First, as noted above, the access request is received from a first computer 122. In one aspect, Alice 106 and Bob 108 could be confirmed with respect to their authentication in a classical manner. Alice 106 logs into the system using a classical standard login procedure.

Then, once Alice 106 has logged in, she needs to be validated by the QSP 126. As a service, the cloud environment 100 will verify Alice 106 using a secure key pair 121 generated at the QEP 120. Other users such as Bob 108 can do the same. The secure key pair 121 is a pair of quantum entangled particles.

Once Alice 106 is verified, only then can she provide a request to communicate with Bob 108 in a secure quantum manner by receiving a sure key pair 121 again from the QSP 126. This secure key pair is used as an authentication process for Alice 106 and Bob 108 to be able to use quantum techniques to identify or authenticate each other.

The quantum identity authentication between Alice 106 and Bob 108 can proceed as follows. This process enables access to the QSP 126 via cloud services authentication. After registering with the QSP 126, in order to start the authentication process with the QSP 126, the user is required to provide the authentication credentials as negotiated during the registration process. Authentication is done via identity verification. One instance is common authentication. A user transmits rID and pwd to the QSP 126. The QSP 126 verifies the credentials (pwd, rID) against values stored during the registration process describe above. The QSP 126 denies access if user is unauthorized. The QSP 126 grants access if verification is successful, and user is then authorized.

In another instance, consider a third-party malicious presence trying to hack the communication. A hacker trying to pose as an authorized user or trying to alter the password "pwd" is a case that needs to be considered. One way of mitigating this is to use classical Multi Factor Authentication (MFA), for which a company can avail of DUO type solutions. The DUO solution is a user-centric access security platform that provides two-factor authentication and is a product provided by Cisco as an example of a MFA that could be applied, as well as other security approaches.

When Alice 106 and Bob 108 verify each other, they can then interact in an enhanced secure environment. They each receive a secure key pair 121 generated by the QEP 120 for use in verifying each other.

The authentication process with the secure key pairs 121 is as follows. Once the authorized user has access to the QEP-based enhanced security services, the QSP 126 starts the process of generation EPR pairs. The QEP 120 generates the required number (n) of EPR pairs. The QEP 120 reserves the initial qubit to form a sequence {qU} of EPR pairs. The QEP 120 applies Hadamard gate operation (H) on the qubits and generates the sequence {qU}. The QEP 120 selects 2n qubits as verification and control qubits from the generated sequence {qU}. The QEP 120 determines the bit value of the password and based on that performs a CNOT operation to generate unentangled qubits for verification. The CNOT operation is a controlled NOT gate that operates on a quantum register consisting of 2 qubits which CNOT gate flips the second qubit if and only if the first qubit (the control qubit) is |1. Then, using the cloud services authentications channel described above, the QEP 120 communicates the verification qubits to the user.

The user side takes the bit value of password and performs Hadamard operation on the check qubits in order to compare if the values match with expectation. If they match, then the authentication process is successful and users can, then engage in EPR-enabled enhanced secure communication utilizing the underlying physical quantum channel. To enable access for activation of applications such as file access, routing authentication etc., the user sends access requests to the QSP 126.

Figure 2A:
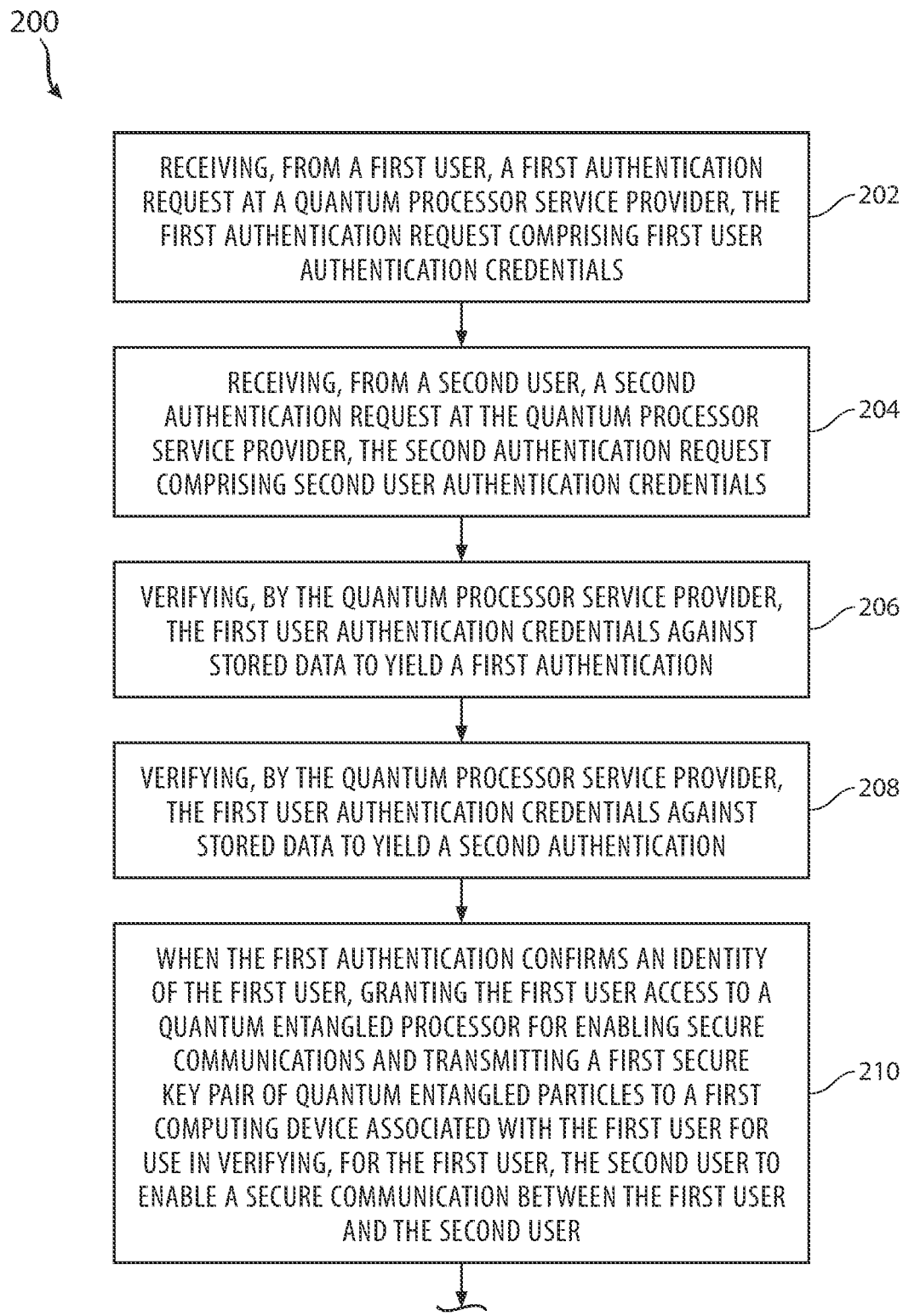
FIGS. 2A-B illustrate an example method embodiment for authenticating users to use the quantum system.
Figure 2B:
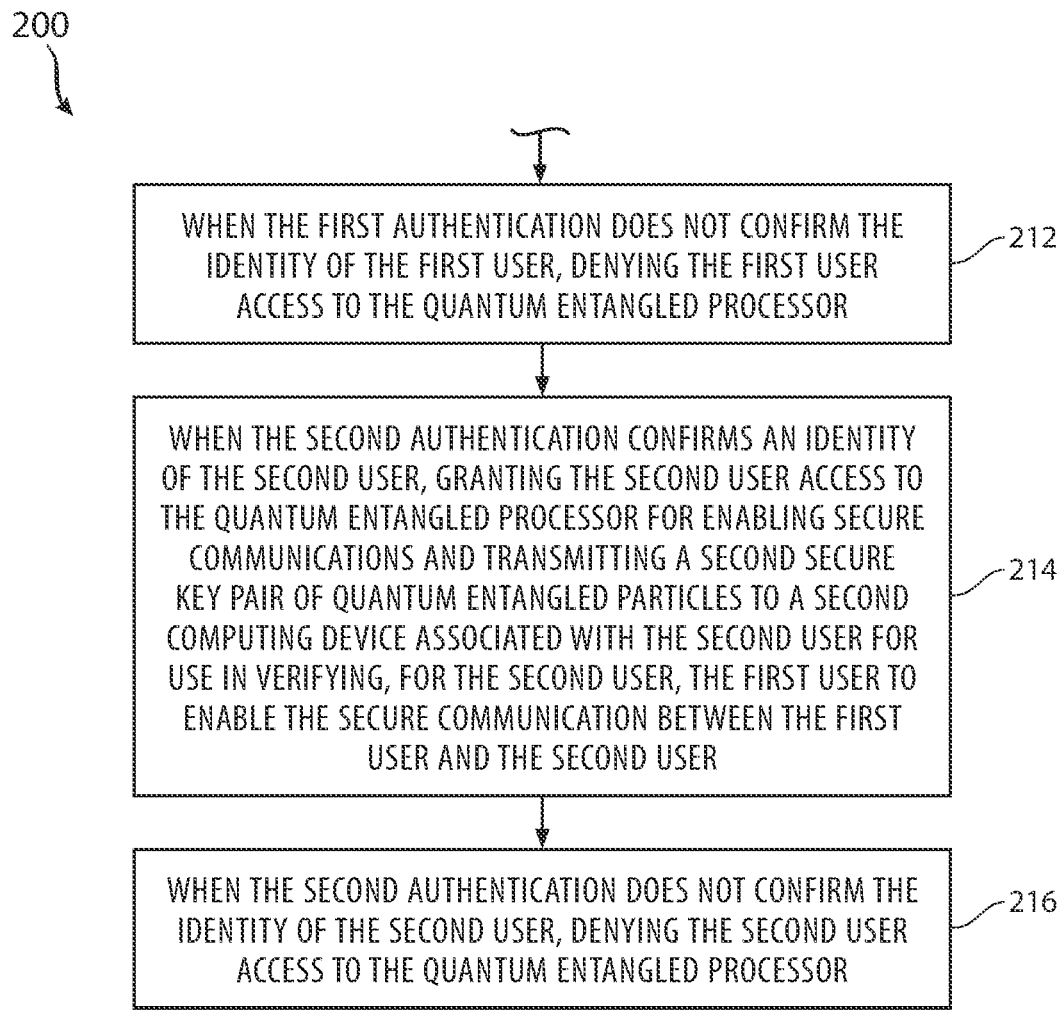

The details of the process are outlined in the method of FIGS. 2A-B. The received secure key pair is shown as feature 117 in the container daemon 114 and as it is provided to one of the end users like Alice 106 or Bob 108, the secure key pair can be represented by feature 124.

The access is requested from a tenant 104 and the request goes to the container daemon 114 and can also be provided to the quantum key management layer 116. A secure key pair 117 can be available in the container daemon 114 for providing verification of the user making the request. The request gets validated by the server 120 and confirms, based on the secure key pair (that she gets), Alice 106 gets the secure key pair and Bob 108 can also get the secure key pair to authenticate him as well. Since the secure key pairs come from the same origin, they can be used for Alice 106 and Bob 108 to confirm their respective identities and then to exchange information also via a quantum channel. Both Alice 106 and Bob 108 can be validated and get the same secure key pair, so that they can also authenticate each other in a quantum manner.

This disclosure builds on currently available existing architecture and technology as a first step to deployment of quantum enhanced security at scale as cloud-based services. The disclosure addresses quantum teleportation-based security for data utilizing an Eckert 91 type protocol. See Ekert. A, Phys. Rev. Lett. 67, 661-663 (1991), incorporated herein by reference.

This includes the concept of a quantum server 120 which handles the EPR (Einstein-Podolsky-Rosen) Bell pairs. Note in FIG. 1 they are called a secure key pair as part of the QEP 120. FIG. 1 depicts the primary architecture of the proposed solution. FIG. 1 depicts a QEP generating server 120 which acts as a source of EPR (Einstein, Podoslky and Rosen) Bell state pairs and offers robust additional security via quantum teleportation.

In order to understand the processes described herein, some background for entanglement distribution with separable states with probabilistic cloning is provided next. With respect to entanglement, the users 104 can be offered the option to tighten their security leveraging quantum teleportation. This option works by distributing entangled quantum particles. These entangled particles, once distributed in a controlled manner between ends, create virtual channels. Quantum teleportation is a phenomenon which leverages entangled Bell pairs for an EPR (Einstein-Podolsky-Rosen) source. Quantum entanglement is one of the fundamental directions of application of quantum information theory. It cannot come from classical communication and related local operations and represents a more complex relationship in the physical systems than is possible in the classical world. Entanglement distribution between different nodes of a quantum network is vital for establishing communication between those nodes.

The general theory is as follows: A sender, say Alice, transmits one particle of an entangled pair to the destination while retaining the other particle as source. For an eavesdropper Eve, it is deemed impossible by the laws of physics to observe and measure the entangled particle without destroying its state. As soon as she measures a specific state, the act of measurement causes the same state to collapse. In other words, there is no way for Eve to breach the security. This property of quantum entanglement renders it a secure channel. Not only is the security tight for an entangled pair, theoretically, a pair of particles can remain entangled independent of distance, even at cosmic scale. Experimentally, quantum entanglement has been proven for up to an approximate distance of 1200 km between space and earth and 50 km on terrestrial experiments. A classically open channel is required for the receiver Bob to efficiently decode the quantum data for which an Eckert 91 type entanglement is proposed for tight security.

The quantum processor service provider 126 can include a quantum EPR (Einstein Podoslky and Rosen) processor (QEP) 120 and a computer server 124 logically co-located with the QEP. The computer server 124 can be configured to execute instructions stored on a computer-readable storage medium, the instructions causing the computer server to perform operations including receiving a registration of a first user at a quantum processor service provider, the registration comprises one or more of a login identification, a registration number, and a password, to yield a first registered user and receiving a request for authentication of the first registered user, the request comprising at least the password and the registration number. When the password and registration number match stored data at the quantum processor service provider for the first registered user, the instructions can cause to be generated, by the QEP 120, an EPR entangled pair 121 and can cause the EPR entangled pair 121 to be transmitted to a first computing device 106 of the first registered user. The first registered user utilizes the EPR entangled pair 121 in order to communicate with a second computing device associated with a second registered user.

The first computing device 106 and the second computing device 108 engage in secure communication utilizing a physical quantum channel. In one aspect, the QEP 120 can be configured to perform operations including generating a number (n) of EPR entangled pairs, wherein the EPR entangled pair is part of the number (n) of EPR entangled pairs, reserving an initial qubit to form a sequence {qU} from the EPR entangled pairs, applying a Hadamard gate operation (H) on a set of qubits to generate the sequence {qU}, selecting $2n$ qubits as verification and control qubits from the sequence {qU}, determining a bit value of the password and based on the bit value, performing a CNOT operation to generate unentangled qubits for verification to yield verification qubits and communicating the verification qubits to the first computing device of the first user, wherein the first computing device takes the bit value of the password and performs the Hadamard gate operation in order to compare if a resulting value matches stored data at the first computing device. When a match between the resulting value and the stored data occurs, the operations can include confirming an authentication to then engage in EPR-enabled enhanced secure communication using a physical quantum channel between the first user device and the second user device. A confirmation of the request for authentication of the first user can establish a cloud services authentications channel between the quantum processor service provider 126 and the first user device 106.

Both the first user of the first computing device 106 and the second user of the second computing device 108 can be authenticated by the quantum processor service provider 126 prior to a creation of a physical quantum channel between the first computing device 106 and the second computing device 108.

Using the EPR entangled pair 121 to communicate between the first computing device 106 and the second computing device 108 can be associated with one or more of a file access, an access to an application, a routing authentication request, an access to a service, a request to utilize compute resources from a cloud services provider. There are various services and applications that can be used and that are represented by the communication between the first computing device 106 and the second computing device 108.

FIGS. 2A-B illustrate a method 200 embodiment. The method 200 can include receiving, from a first user, a first authentication request at a quantum processor service provider, the first authentication request comprising first user authentication credentials (202), receiving, from a second user, a second authentication request at the quantum processor service provider, the second authentication request comprising second user authentication credentials (204), verifying, by the quantum processor service provider, the first user authentication credentials against stored data to yield a first authentication (206) and verifying, by the quantum processor service provider, the first user authentication credentials against stored data to yield a second authentication (208).

The method can include additional steps, such as, when the first authentication confirms an identity of the first user, granting the first user access to a quantum entangled processor for enabling secure communications and transmitting a first secure key pair of quantum entangled particles to a first computing device associated with the first user for use in verifying, for the first user, the second user to enable a secure communication between the first user and the second user (210).

The method can include, when the first authentication does not confirm the identity of the first user, denying the first user access to the quantum entangled processor (212) and, when the second authentication confirms an identity of the second user, granting the second user access to the quantum entangled processor for enabling secure communications and transmitting a second secure key pair of quantum entangled particles to a second computing device associated with the second user for use in verifying, for the second user, the first user to enable the secure communication between the first user and the second user (214).

The method can further include, when the second authentication does not confirm the identity of the second user, denying the second user access to the quantum entangled processor (216).

When the first authentication confirms an identity of the first user and the second authentication confirms an identity of the second user, and when the first computing device receives the first secure key pair of quantum entangled particles and the second computing device receives the second secure key pair of quantum entangled particles, the method further can include using the first secure key pair of quantum entangled particles and the second secure key pair of quantum entangled particles to enable secure quantum communications between the first computing device and the second computing device.

The first computing device and the second computing device each can include a respective quantum entangled pair storage device enabling the first computing device and the second computing device to receive respectively the first secure key pair of quantum entangled particles and the second secure key pair of quantum entangled particles.

In one aspect, the quantum processor service provider 126 can include a quantum entangled pair generation device 120 and a computer server 124 which registers the first user and the second user with the quantum processor service provider. The server 124 can include some of the components shown in FIGS. 4 and 5.

The quantum entangled pair generation device 120 and the computer server 124 can be logically co-located. Communicating between the first user and the second user via their respective devices can relate to one or more of a file access, an access to an application, a routing authentication request, an access to a service, a request to utilize compute resources from a cloud services provider.

Figure 3A:
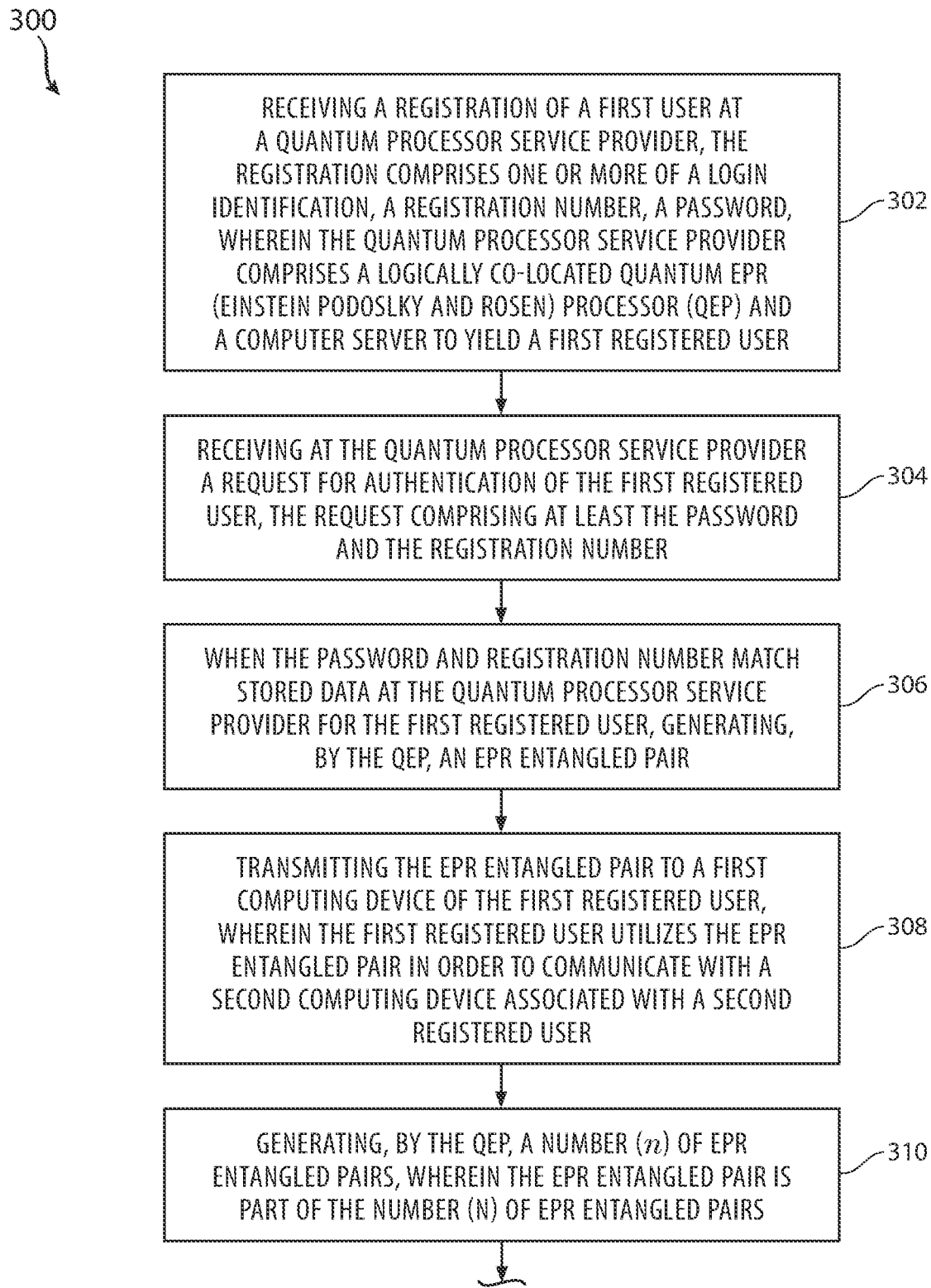
FIGS. 3A-B illustrate another example method.
Figure 3B:
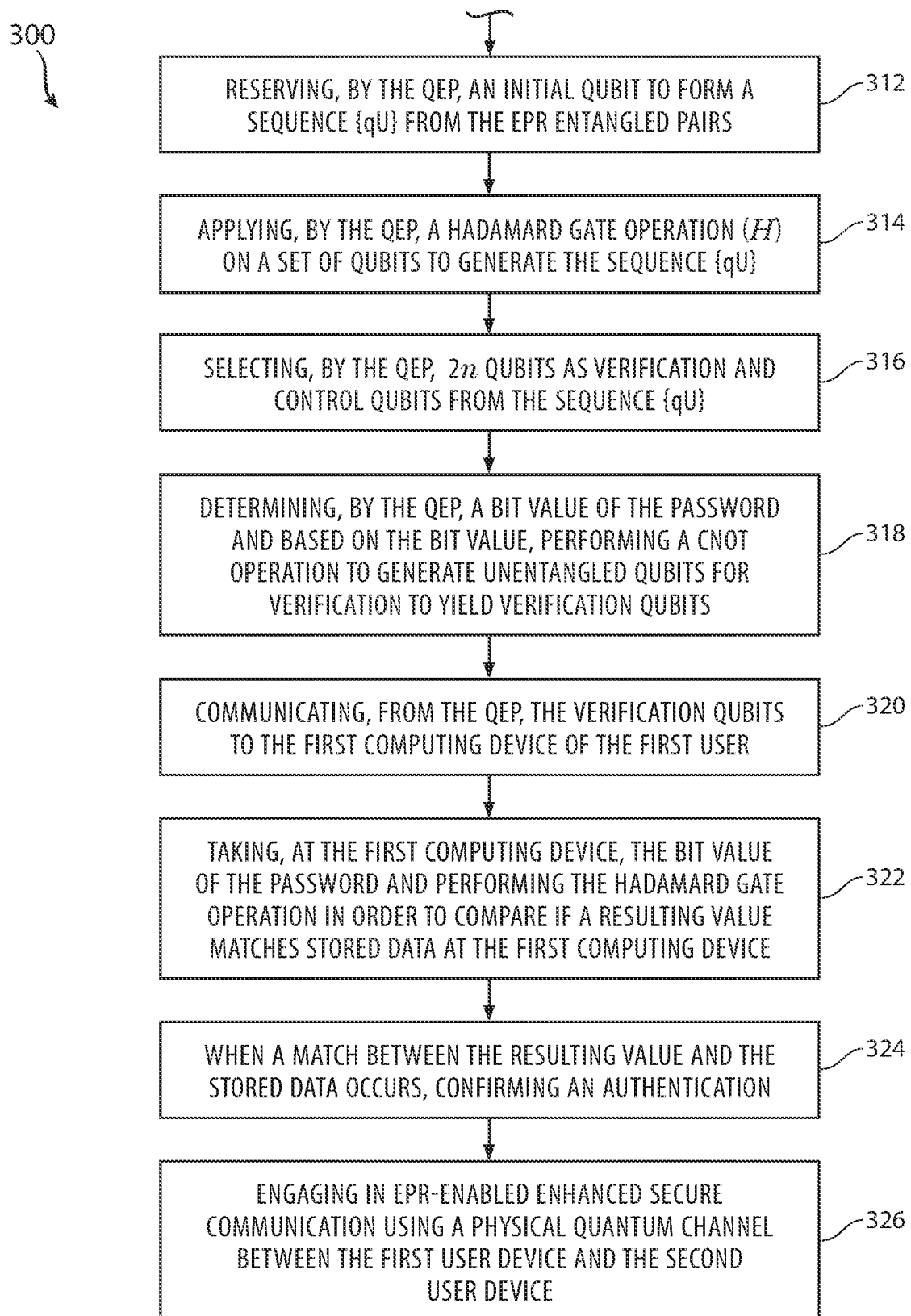

FIGS. 3A-B illustrate another method 300 embodiment. The method 300 can include receiving a registration of a first user at a quantum processor service provider, the registration comprises one or more of a login identification, a registration number, a password, wherein the quantum processor service provider comprises a logically co-located quantum EPR (Einstein Podoslky and Rosen) processor (QEP) and a computer server to yield a first registered user (302), receiving at the quantum processor service provider a request for authentication of the first registered user, the request comprising at least the password and the registration number (304), when the password and registration number match stored data at the quantum processor service provider for the first registered user, generating, by the QEP, an EPR entangled pair (306) and transmitting the EPR entangled pair to a first computing device of the first registered user, wherein the first registered user utilizes the EPR entangled pair in order to communicate with a second computing device associated with a second registered user (308).

The first computing device and the second computing device engage in secure communication utilizing a physical quantum channel. The method can further include generating, by the QEP, a number (n) of EPR entangled pairs, wherein the EPR entangled pair is part of the number (n) of EPR entangled pairs (310), reserving, by the QEP, an initial qubit to form a sequence {qU} from the EPR entangled pairs (312), applying, by the QEP, a Hadamard gate operation (H) on a set of qubits to generate the sequence {qU} (314), selecting, by the QEP, 2n qubits as verification and control qubits from the sequence {qU} (316), determining, by the QEP, a bit value of the password and based on the bit value, performing a CNOT operation to generate unentangled qubits for verification to yield verification qubits (318), communicating, from the QEP, the verification qubits to the first computing device of the first user (320), taking, at the first computing device, the bit value of the password and performing the Hadamard gate operation in order to compare if a resulting value matches stored data at the first computing device (322), when a match between the resulting value and the stored data occurs, confirming an authentication (324) and engaging in EPR-enabled enhanced secure communication using a physical quantum channel between the first user device and the second user device (326).

A confirmation of the request for authentication of the first user can establish a cloud services authentications channel between the quantum processor service provider 126 and the first user device 106.

Both the first user of the first computing device 106 and the second user of the second computing device 108 are authenticated by the quantum processor service provider 126 prior to a creation of a physical quantum channel between the first computing device and the second computing device. In one aspect, using the EPR entangled pair to communicate between the first computing device 106 and the second computing device 108 is associated with one or more of a file access, an access to an application, a routing authentication request, an access to a service, a request to utilize compute resources from a cloud services provider.

Figure 4:
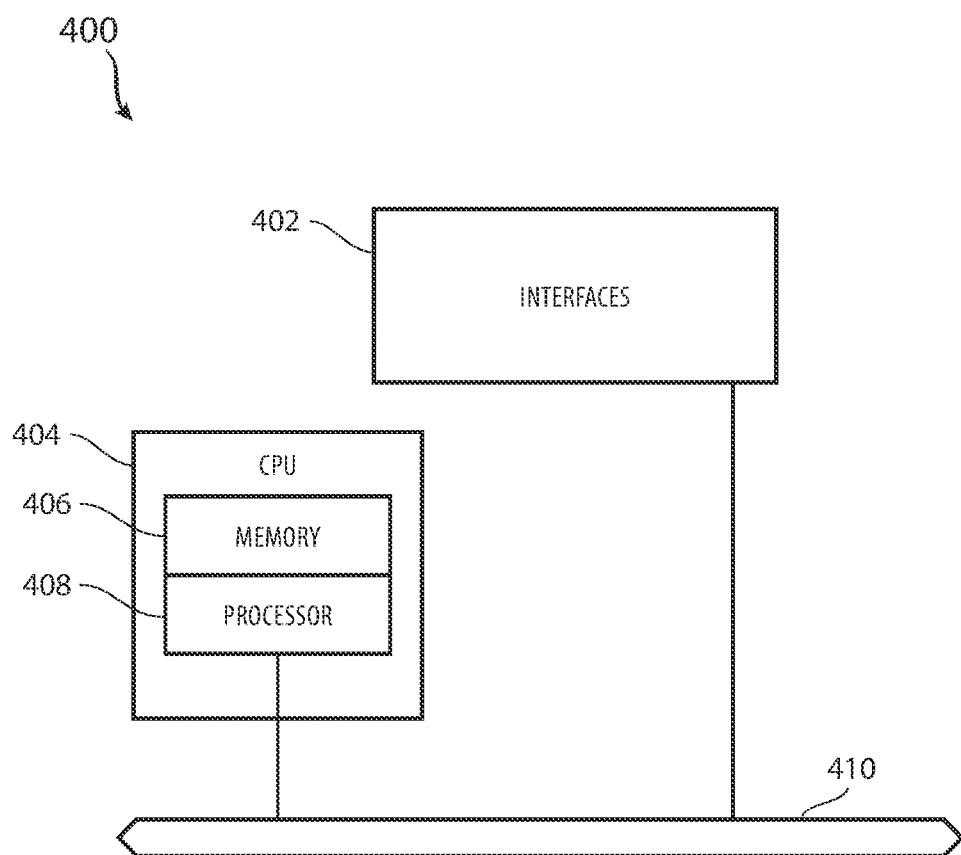
FIG. 4 illustrates an example network device in accordance with various examples.

FIG. 4 illustrates an example network device 400 suitable for implementing aspects of this disclosure. The network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. The CPU 404 may include one or more processors 408, such as a processor from the INTEL X86 family of microprocessors. In some cases, processor 408 can be specially designed hardware for controlling the operations of the network device 400. In some cases, a memory 406 (e.g., non-volatile RAM, ROM, etc.) also forms part of the CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 404 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store data structures such as mobility binding, registration, and association tables, etc. The memory 406 could also hold various software containers and virtualized execution environments and data.

The network device 400 can also include an application-specific integrated circuit (ASIC), which can be configured to perform routing and/or switching operations. The ASIC can communicate with other components in the network device 400 via the connection 410, to exchange data and signals and coordinate various types of operations by the network device 400, such as routing, switching, and/or data storage operations, for example.

Figure 5:
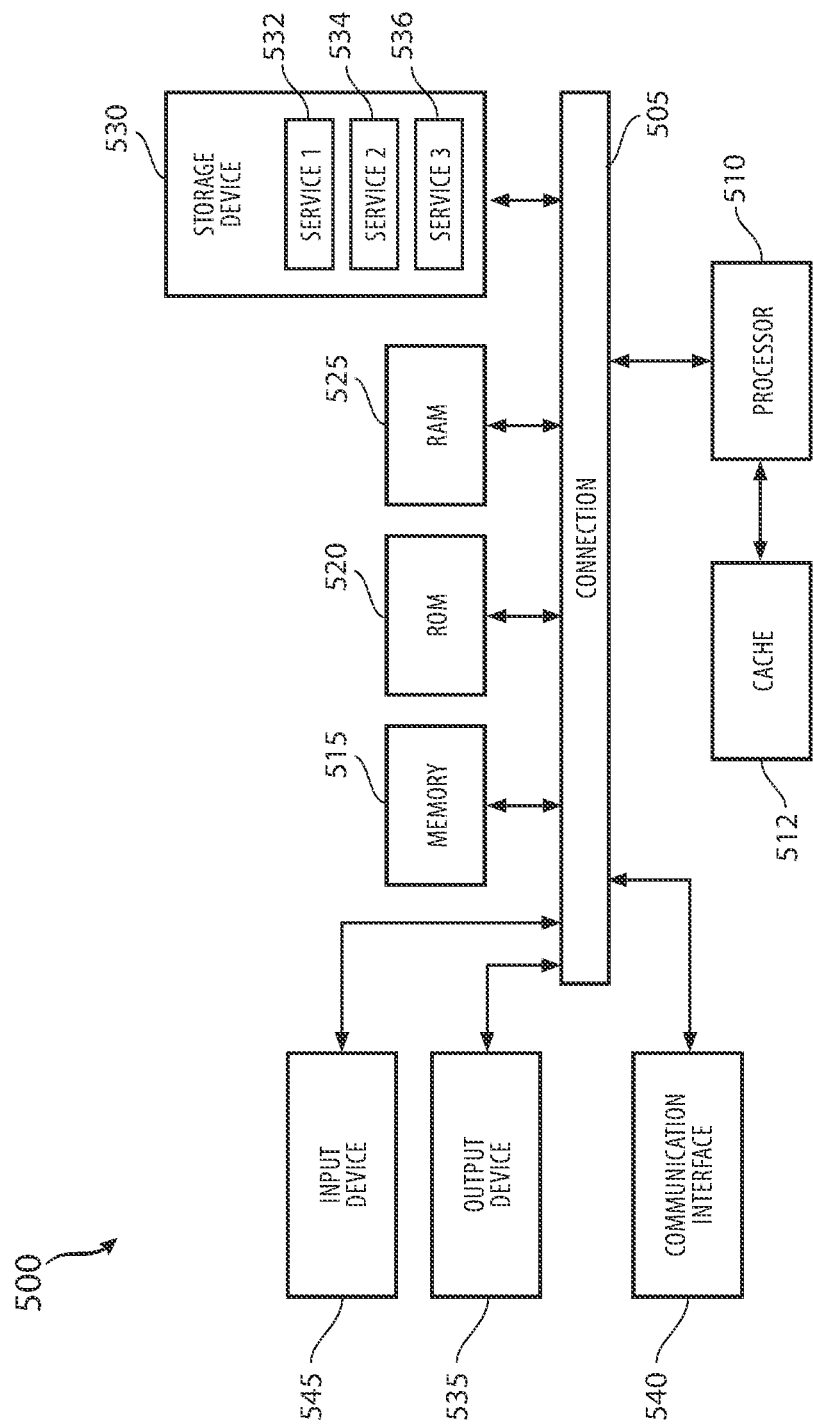
FIG. 5 illustrates an example computing device architecture, in accordance with some examples.

FIG. 5 illustrates an example computing device architecture 500 of an example computing device which can implement the various techniques described herein. The components of the computing device architecture 500 are shown in electrical communication with each other using a connection 505, such as a bus. The example computing device architecture 500 includes a processing unit (CPU or processor) 510 and a computing device connection 505 that couples various computing device components including the computing device memory 515, such as read only memory (ROM) 520 and random access memory (RAM) 525, to the processor 510.

The computing device architecture 500 can include a cache of high-speed memory connected directly with, in close proximity to, or integrated as part of the processor 510. The computing device architecture 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other computing device memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the processor design. The processor 510 may be a self-contained system, containing multiple cores or processors, a bus, memory controller, cache, etc. A multi-core processor may be symmetric or asymmetric.

To enable user interaction with the computing device architecture 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art, such as a display, projector, television, speaker device, etc. In some instances, multimodal computing devices can enable a user to provide multiple types of input to communicate with the computing device architecture 500. The communications interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. The storage device 530 can include services 532, 534, 536 for controlling the processor 510. Other hardware or software modules are contemplated. The storage device 530 can be connected to the computing device connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks including devices, device components, steps or routines in a method embodied in software, or combinations of hardware and software.

The present disclosure provides a proposed BFD low bandwidth implementation which can reduce the BFD overhead buy as much as 50% which would provide a large gain for SDWAN (software-defined networking in a wide-area network) customers.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, from a first user device associated with a first user, a first authentication request at a quantum processor service provider, the first authentication request comprising first user authentication credentials;
receiving, from a second user device associated with a second user, a second authentication request at the quantum processor service provider, the second authentication request comprising second user authentication credentials;
verifying, by the quantum processor service provider, the first user authentication credentials to yield a first authentication;
verifying, by the quantum processor service provider, the first user authentication credentials to yield a second authentication; and
when the first authentication confirms an identity of the first user:
granting, to the first user device, access to a quantum entangled processor for enabling secure communications; and
when the first authentication does not confirm the identity of the first user, denying, to the first user, access to the quantum entangled processor; and
when the second authentication confirms an identity of the second user:
granting, to the second user device, access to the quantum entangled processor for enabling secure communications;
when the second authentication does not confirm the identity of the second user, denying, to the second user device, access to the quantum entangled processor, and
when the first authentication confirms an identity of the first user and the second authentication confirms an identity of the second user, and when the first user device receives a first secure key pair of quantum entangled particles and the second user device receives a second secure key pair of quantum entangled particles, using the first secure key pair of quantum entangled particles and the second secure key pair of quantum entangled particles to enable secure quantum communications between the first user device and the second user device.

2. The method of claim 1, further comprising:
transmitting a first secure key pair of quantum entangled particles to the first user device for use in verifying, for the first user, the second user to enable a secure communication between the first user and the second user; and
transmitting a second secure key pair of quantum entangled particles to the second user device for use in verifying, for the second user, the first user to enable the secure communication between the first user device and the second user device.

3. The method of claim 2, wherein the first user device and the second user device each comprise a respective quantum entangled pair storage device enabling the first user device and the second user device to receive respectively the first secure key pair of quantum entangled particles and the second secure key pair of quantum entangled particles.

4. The method of claim 2, wherein the quantum processor service provider comprises a quantum entangled pair generation device and a computer server which registers the first user and the second user with the quantum processor service provider.

5. The method of claim 4, wherein the quantum entangled pair generation device and the computer server are logically co-located.

6. The method of claim 1, wherein communicating between the first user device and the second user device relates to one or more of a file access, an access to an application, a routing authentication request, an access to a service, a request to utilize compute resources from a cloud services provider.

7. An apparatus comprising:
one or more processors; and
a computer-readable storage medium coupled to the one or more processors and configured to:
  receive, from a first user device of a first user, a first authentication request, the first authentication request comprising first user authentication credentials;
  receive, from a second user device of a second user, a second authentication request, the second authentication request comprising second user authentication credentials;
  verify the first user authentication credentials to yield a first authentication;
  verify the second user authentication credentials to yield a second authentication;
  when the first authentication confirms an identity of the first user, grant, to the first user device, access to a quantum entangled processor for enabling secure communications;
  when the first authentication does not confirm the identity of the first user, deny, to the first user device, access to the quantum entangled processor;
  when the second authentication confirms an identity of the second user, grant, to the second user device, access to the quantum entangled processor for enabling secure communications;
  when the second authentication does not confirm the identity of the second user, deny, to the second user device, access to the quantum entangled processor, and
  when the first authentication confirms an identity of the first user and the second authentication confirms an identity of the second user, and when the first user device receives a first secure key pair of quantum entangled particles and the second user device receives a second secure key pair of quantum entangled particles, using the first secure key pair of quantum entangled particles and the second secure key pair of quantum entangled particles to enable secure quantum communications between the first user device and the second user device.

8. The apparatus of claim 7, wherein the apparatus comprises a quantum processor service provider.

9. The apparatus of claim 8, wherein the computer-readable storage medium is further coupled to the one or more processors and configured to:
  transmit a first secure key pair of quantum entangled particles to the first user device for use in verifying, for the first user, the second user to enable a secure communication between the first user device and the second user device; and
  transmit a second secure key pair of quantum entangled particles to the second user device associated with the second user for use in verifying, for the second user, the first user to enable the secure communication between the first user device and the second user device.

10. The apparatus of claim 9, wherein the first user device and the second user device each comprise a respective quantum entangled pair storage device enabling the first user device and the second user device to receive respectively the first secure key pair of quantum entangled particles and the second secure key pair of quantum entangled particles.

11. The apparatus of claim 9, wherein the apparatus comprises a quantum entangled pair generation device and a computer server which registers the first user and the second user with the quantum processor service provider.

12. The apparatus of claim 11, wherein the quantum entangled pair generation device and the computer server are logically co-located.

13. The apparatus of claim 7, wherein communicating between the first user device and the second user device relates to one or more of a file access, an access to an application, a routing authentication request, an access to a service, a request to utilize compute resources from a cloud services provider.

14. A method comprising:
  receiving, from a user device of a user, an authentication request at a quantum processor service provider, the authentication request comprising user authentication credentials;
  verifying, by the quantum processor service provider, the user authentication credentials to yield an authentication; and
  when the authentication confirms an identity of the user:
  granting, to the user device, access to a quantum entangled processor for enabling secure communications; and
  transmitting a secure key pair of quantum entangled particles to the user device for use in verifying, for the user, a second user device of a second user to enable a secure communication between the user device and the second user device;
  when the authentication does not confirm the identity of the user, denying, to the user, access to the quantum entangled processor, and
  when the authentication confirms an identity of the user and a second authentication confirms an identity of the second user, and when the user device receives the secure key pair of quantum entangled particles and the second user device receives a second secure key pair of quantum entangled particles, using the secure key pair of quantum entangled particles and the second secure key pair of quantum entangled particles to enable secure quantum communications between the user device and the second user device.

15. The method of claim 14, wherein the user device and the second user device each comprise a respective quantum entangled pair storage device enabling the user device and the second user device to receive respectively the secure key pair of quantum entangled particles and the second secure key pair of quantum entangled particles.

16. The method of claim 14, wherein the quantum processor service provider comprises a quantum entangled pair generation device and a computer server which registers the user and the second user with the quantum processor service provider.

17. The method of claim 16, wherein the quantum entangled pair generation device and the computer server are logically co-located and wherein communicating between the user device and the second user device relates to one or more of a file access, an access to an application, a routing authentication request, an access to a service, a request to utilize compute resources from a cloud services provider.

* * * * *